Sept. 4, 1928.
W. F. J. CASEY ET AL
1,683,286
LOCOMOTIVE BOOSTER DEVICE
Filed Aug. 3, 1922  3 Sheets-Sheet 1
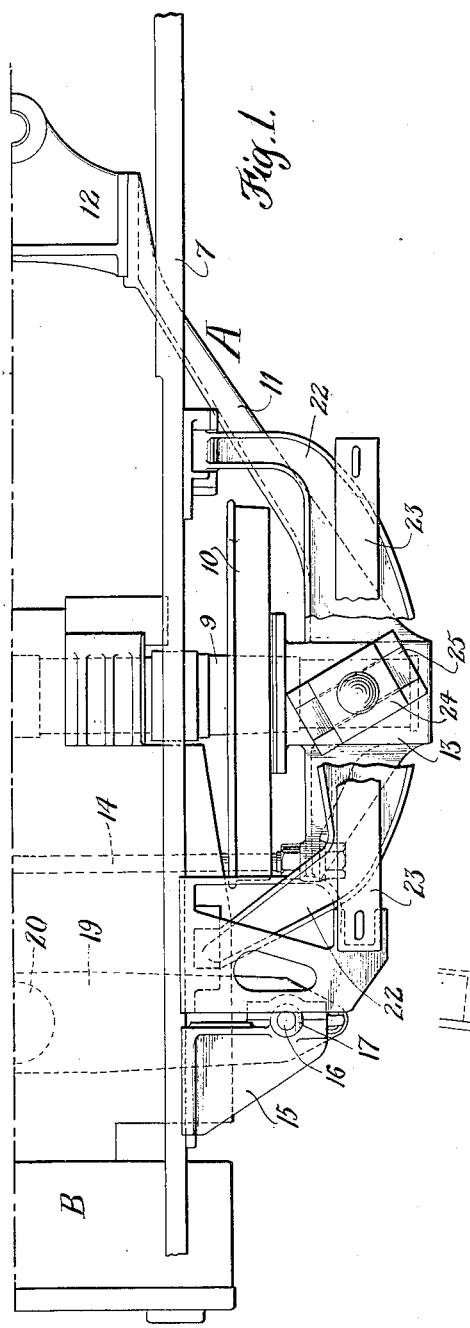
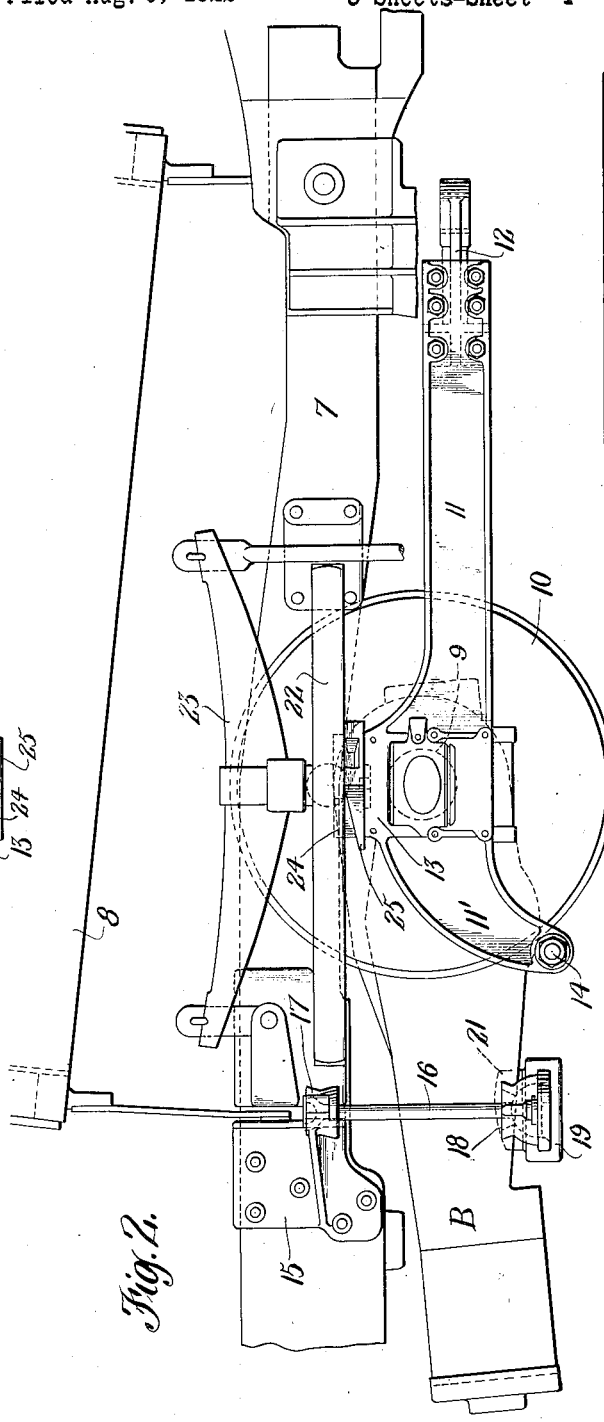
INVENTORS
William F. J. Casey
Gustave Cavin
BY
Fetherstonhaugh & Co ATTORNEYS

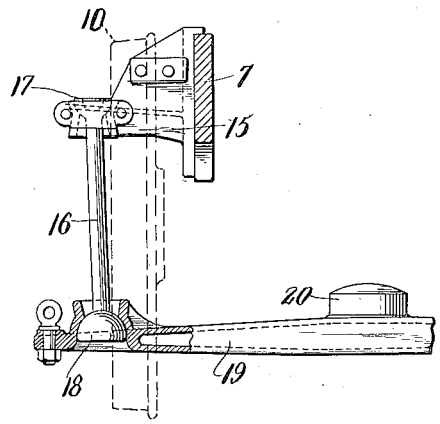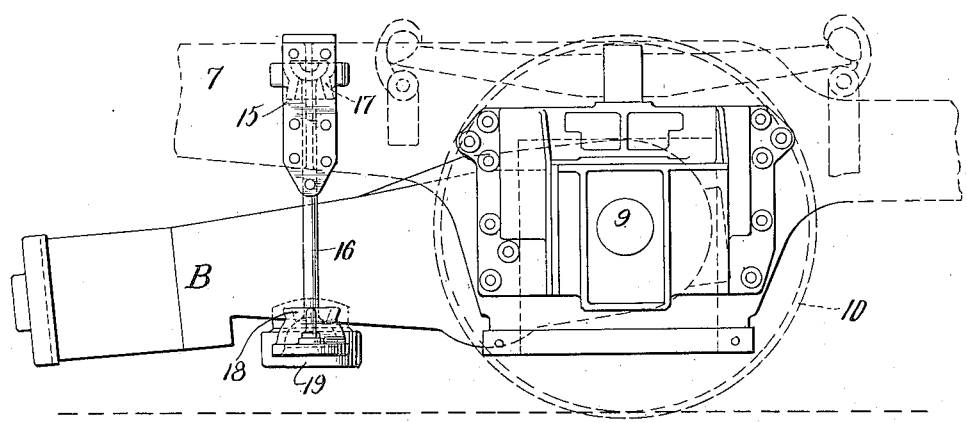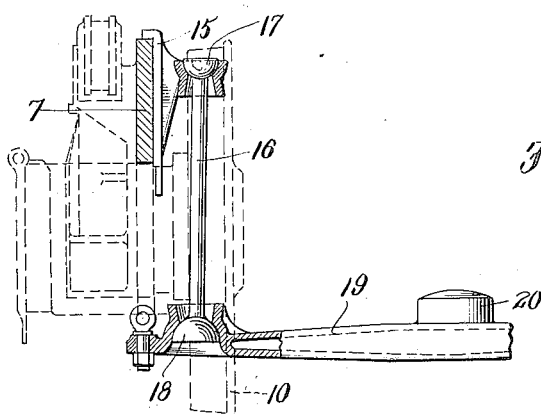

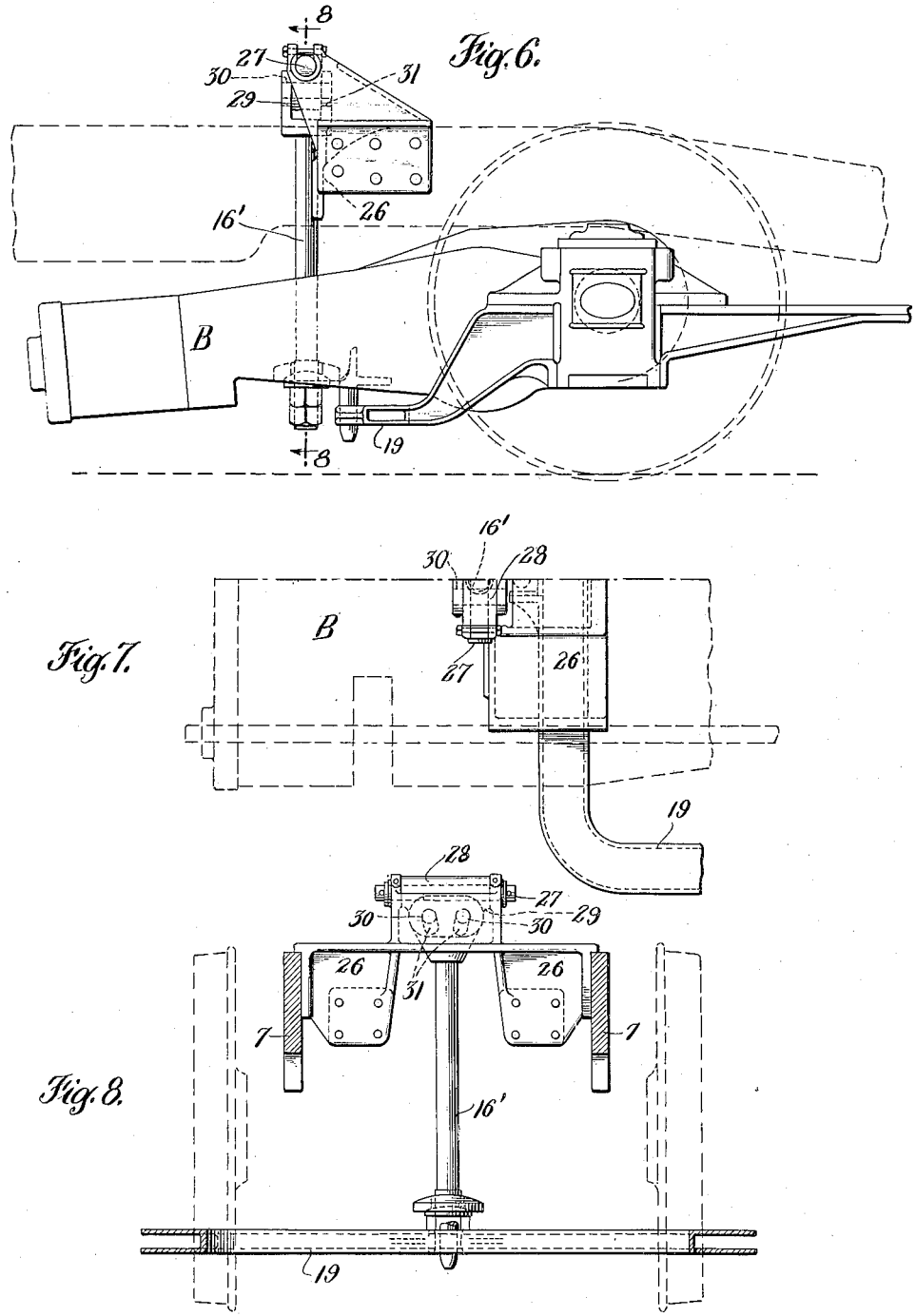

Patented Sept. 4, 1928.

1,683,286

UNITED STATES PATENT OFFICE.

WILLIAM F. J. CASEY AND GUSTAVE CAVIN, OF KINGSTON, ONTARIO, CANADA, ASSIGNORS, BY MESNE ASSIGNMENTS, TO C-S ENGINEERING COMPANY, A CORPORATION OF DELAWARE.

LOCOMOTIVE BOOSTER DEVICE.

Application filed August 3, 1922. Serial No. 579,445.

This invention relates to locomotive booster devices and particularly to such as have the booster applied to a radial truck, such for example, as the trailing truck of a locomotive.

One of the primary objects of our invention is to provide an improved form of support for the booster, which is simple and effective and which at the same time permits the truck and booster to move relative to the locomotive structure in curving.

Another object of our invention is to provide a simplified form of frame for the truck in which size and weight are reduced to a minimum.

Still another object of the invention has to do with the provision of safety means for supporting the booster motor in the event of failure of the suspension support therefor.

The foregoing, together with such other objects as may hereinafter appear, or are incident to our invention, we obtain by means of a construction which we have illustrated in preferred form in the accompanying drawings, wherein:

Fig. 1 is a half-plan view of a truck and booster motor embodying our improvement; Fig. 2 is a side elevation of Fig. 1; Fig. 3 is a fragmentary sectional view illustrating the suspension means for the booster motor; Fig. 4 is a fragmentary side elevation of a modification of our invention; Fig. 5 is a sectional view corresponding to Fig. 3 but illustrating the modified arrangement of suspension means shown in Fig. 4; Fig. 6 is a side elevation of another modification of our invention; Fig. 7 is a partial plan view of the construction of Fig. 6; and Fig. 8 is a section taken on the line 8—8 of Fig. 6.

Referring now to the construction of Figs. 1 to 3 inclusive, only such portions of the locomotive structure as are necessary to a proper understanding of our invention are illustrated. The reference numeral 7 indicates a side frame of the locomotive and the reference numeral 8, the bottom of the fire box. The truck proper comprises the axle 9, the wheels 10, and the radius frame, indicated as a whole by the reference letter A. This frame is composed of a pair of radius bars 11 having their forward ends connected to the member 12 which is adapted to be pivotally connected with the locomotive frame. The boxes 13 are preferably formed integrally with the radius bars 11 and such bars extend rearwardly of the boxes, such rearward extensions 11' being dropped down and connected at their bottoms by means of a tiebar 14, for a purpose which will hereinafter appear. The booster motor is indicated as a whole by the reference letter B and it will be seen that its forward end is supported on the axle 9, which is driven through gearing (not shown).

The booster motor is also supported from the main frame of the locomotive in the following manner:

A bracket 15 (see Fig. 3) is secured to each side frame of the locomotive and depending from each bracket is a suspension link 16 having a ball and socket connection with the bracket 15, as indicated at 17. Carried on the lower ends of the suspension link 16 by means of a similar ball and socket connection 18, is a suspension beam 19. In its middle portion this beam is provided with an upstanding boss 20 fitting into a corresponding recess 21 in the booster bed plate. The suspension links and beam constitute in effect a cradle which vertically supports the booster motor but at the same time readily compensates for and permits the truck and booster to swing laterally with respect to the locomotive structure as service conditions demand.

In addition to the foregoing advantages it will be observed that the arrangement is one which tends to minimum size and weight of the truck proper which is of considerable importance from a practical standpoint.

The tiebar 14 not only serves to brace the radius bars 11 as against spreading and pinching movements but also acts as a safety member which will support the booster motor in the event of failure of the link suspension means.

The reference numeral 22 indicates a spring yoke for supporting the springs 23 against displacement or distortion during curving, suitable slip plates 24 and 25 being interposed to permit the truck to swing.

In the construction of Figs. 4 and 5 substantially the same suspension support for the booster motor is illustrated, these figures, however, showing the brackets 15 and suspension links 16 on the inside of the side frames 7 instead of on the outside, as in Figs. 1 to 3 inclusive.

In the construction of Figs. 6 to 8, inclusive, instead of employing a pair of suspension links 16, we use but one, 16', located centrally and supported from a cross member 26 carried by the side frames. The cross member 26 carries a pin 27 and sleeve 28, the upper end of the suspension link being clevised to embrace the tongue 29 depending from the sleeve 28. The tongue 29 carries two pins 30 fitting into arcuate slots 31 in the upper end of the suspension link 16'. During curving the weight of the booster will be supported on one or the other of the pins 30, as the case may be, and since such pins are offset, the booster will be gravity assisted in returning to center as the truck leaves the curve. In this respect the suspension arrangement of Figs. 1 to 5, inclusive will automatically function in this manner.

What we claim is:

1. The combination with a locomotive of a truck having an axle and wheels, a booster motor for driving said wheels in part supported on said truck, and means also supporting the motor from the locomotive structure including a suspension member and a substantially universal connection.

2. The combination with a locomotive of a truck having an axle and wheels, a booster motor for driving said wheels in part supported on said truck, and means also supporting the motor from the locomotive structure including a suspension member and a ball joint.

3. The combination with a locomotive of a truck having an axle and wheels, a booster motor for driving said wheels in part supported on said truck, and means also supporting the motor from the locomotive structure including a suspension member provided with a ball joint at each end.

4. The combination with a locomotive of a truck having an axle and wheels and movable relative to the locomotive structure, a booster motor for driving said axle supported in part on said truck, means for maintaining the motor in alignment with the axle, and means for supporting the motor from the locomotive structure including a suspension member and a substantially universal connection.

5. The combination with a locomotive of a truck having an axle and wheels, a booster motor for driving said wheels in part supported on said truck, and means also supporting the motor from the locomotive structure including a suspension beam and a pair of suspension links having substantially universal connections.

6. The combination with a locomotive, of a truck having an axle and wheels, a booster motor for driving said wheels, in part supported on said truck, and means also supporting the motor from the locomotive structure including a suspension beam and a pair of suspension links each having a ball and socket joint at each end.

7. The combination with a locomotive having a frame, of a radial truck having an axle and wheels, a booster motor for driving the wheels in part supported on the truck, and means for supporting the motor from the frame including a member secured to the frame and a suspension link having a substantially universal connection with said member.

8. The combination with a locomotive of a radial truck comprising an axle with wheels, a radius bar frame, boxes integral with the radius bars, said bars extending rearwardly of the boxes, and a tiebar connecting such rearwardly extending portions of the radius bars; a booster motor supported on the axle; and means for suspending the motor from the locomotive; said tiebar extending beneath the booster motor so as to support the same on failure of the suspension means.

9. In a locomotive, the combination, with a main frame, and a trailing truck having a frame formed rigid with the journal boxes, of an auxiliary engine for the trailing truck; and means for supporting said auxiliary engine from the main frame.

10. In a locomotive, a main frame, a trailing truck, an auxiliary engine frame for the trailing truck, a transverse beam beneath said auxiliary engine frame, means for supporting said beam from said main frame, and a ball and socket bearing on said beam for said auxiliary engine frame.

11. In a locomotive, a main frame, a trailing truck, an auxiliary engine frame for said trailing truck, a transverse beam beneath said auxiliary engine frame, means pivotally suspending the opposite ends of said beam from said main frame, and a universal bearing for said auxiliary engine frame on said beam intermediate its ends.

12. In a locomotive, a main frame, a trailer truck, including a wheeled axle, depending elements at the sides of said main frame, a horizontal beam carried by said elements, a universal joint bearing on said beam, and a booster motor mounted on said beam through said bearing and on said axle.

13. In a locomotive, a main frame, a trailer axle partially supporting said frame, an auxiliary engine for said axle, a transverse beam beneath said auxiliary engine, means for supporting said beam from said main frame, and a ball and socket bearing on said beam for said auxiliary engine.

14. In a locomotive, a main frame, a trailer axle partially supporting said frame, an auxiliary engine for said axle, a transverse beam beneath said auxiliary engine, means pivotally suspending the opposite ends of said beam from said main frame, and a universal bearing for said auxiliary engine on said beam intermediate its ends.

15. In a locomotive, a main frame, a trailer axle partially supporting said frame, depending elements at the sides of said main frame, a horizontal beam carried by said elements, a universal joint bearing on said beam, and a booster motor mounted on said beam through said bearing and on said axle.

In testimony whereof, we have hereunto signed our names.

WILLIAM F. J. CASEY.
GUSTAVE CAVIN.